F. JACOBY.
Apparatus for Extracting Wort and Similar Liquids.
No. 81,785.                                         Patented Sept. 1, 1868.
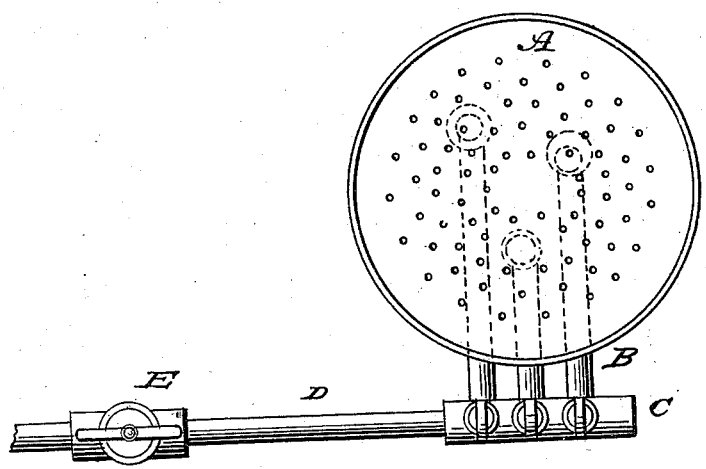
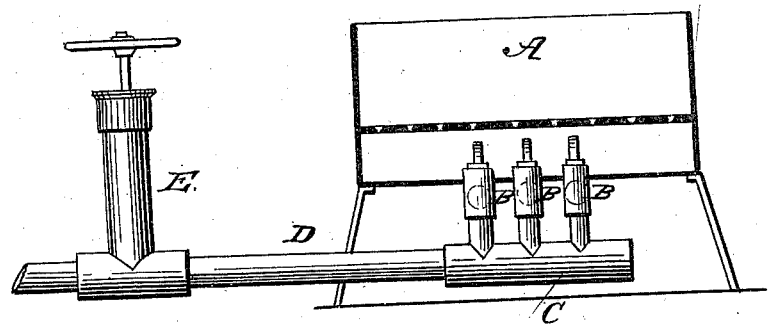

United States Patent Office.

F. JACOBY, OF ST. LOUIS, MISSOURI.

*Letters Patent No. 81,785, dated September 1, 1868.*

IMPROVED APPARATUS FOR EXTRACTING WORT AND SIMILAR LIQUIDS.

*The Schedule referred to in these Letters Patent and making part of the same.*

TO ALL WHOM IT MAY CONCERN:

Be it known that I, F. JACOBY, of the city of St. Louis, in the county of St. Louis, and State of Missouri, have made certain new and useful Improvements in Apparatus for Extracting Wort and Similar Liquids; and I do hereby declare that the following is a full and clear description thereof, reference being had to the accompanying drawings, and to the letters of reference marked thereon.

It is well known, that in the ordinary processes of brewing beer, ale, and similar liquids, hot or warm water is used to extract the wort from malt, and for this purpose a mash-tub is used having a perforated false bottom, and in said tub the said infusion is made. After the process has been sufficiently prolonged, the liquid extract or "wort" is drawn off, it having passed through the interstices of the false bottom of the tub into a sub-compartment.

In this method of extracting wort, this liquid must permeate down through the moist malt in the mash-tub, and the quantity of wort retained in the malt-mash is therefore a large one.

Again, to insure a more perfect extraction of wort, the mash must remain for a considerable time, in order that the wort may filter through the same, and collect in the sub-compartment of the mash-tub; but especially in warm weather, owing to the rapid action of the destructive fermentation, a long detention of the mash becomes very injurious.

To expedite said process of extracting wort, the nature of my invention is the general application of an air-pump, (or some similarly-acting device for extracting the wort,) to connect with the sub-compartment of the mash-tub, in such wise that the wort shall be speedily removed out of said compartment, and a partial vacuum there formed, when, by action of atmospheric pressure, the wort still infused in the malt-mash will be forced downward to the sub-compartment, to be therefrom removed.

To enable those skilled in these arts to make and use my said invention, I will now describe the same more fully, referring to—

Figure 1 as a general plan, and

Figure 2 as a sectional elevation of my said apparatus.

I use the usual form of mash-tub A, having the perforated false bottom a. Within said tub the usual mashing-machinery is placed, and connected therewith are the usual water-pipes.

In addition to the parts usually connected with the mash-tub, I arrange a series of wort-drain pipes, B, so placed and constructed as to drain the sub-compartment of the tub A as effectually and readily as possible. The pipes B may then be perforated coils, lying spirally below the sub-compartment of the tub, or they may be pipes with ends covered by strainers, and placed somewhat as indicated in fig. 1 by dotted lines.

Said pipes B connect, by stop-cocks b or valves, with the concentrating-head C, and from this a connecting-pipe, D, connects with the pump E. This pump is in the usual form of combined suction and force-pump, it being arranged to draw the wort accumulating in the sub-compartment, and also to create a partial vacuum herein, thereby causing the wort still suspended in the mash above to sicker down into said sub-compartment, to be then drawn off. Again, said pump is used to force the wort thus drawn from the mash-tub to the other receptacles, where it is subjected to the later processes usual in brewing.

By the action of the pump E, the wort will be extracted much faster than ordinarily from the mash, thereby preventing much loss by injurious fermentation; and again, a much greater percentage of wort will be extracted than in usual processes.

I am aware that, instead of by said pump E, a partial vacuum may be created by many other devices. Thus, if the connecting-pipes D be placed vertically, and be made long enough, then, by causing the accumulated wort to act as a solid column in said pipes D, a partial vacuum may be caused, in the general manner of a siphon. All such variations of specially-constructed devices are believed to be embraced in this invention.

Having thus fully described my invention, what I claim, is—

1. The application of a partial vacuum in the sub-compartment of a mash-tub, to cause the wort to accumulate more quickly, and to cause its extraction more thoroughly out of the mash, substantially as set forth.

2. The combination of the pump E, its connecting-pipe D, with the concentrating-head C, and the drain-pipes B and mash-tub A, substantially as and for the purpose set forth.

F. JACOBY.

Witnesses:
  GEO. P. HERTHEL, Jr.,
  M. RANDOLPH.